United States Patent
Dekock et al.

(10) Patent No.: US 6,772,629 B1
(45) Date of Patent: Aug. 10, 2004

(54) DIAPHRAGM GAS METER TANGENT ASSEMBLY UTILIZING A CAM FOR STROKE ADJUSTMENT

(75) Inventors: Wayne Dekock, Nebraska City, NE (US); Kevin Hurley, Lincoln, NE (US)

(73) Assignee: American Meter Company, Horsham, PA (US)

( * ) Notice: Subject to any disclaimer, the term of this patent is extended or adjusted under 35 U.S.C. 154(b) by 0 days.

(21) Appl. No.: 10/436,760

(22) Filed: May 13, 2003

(51) Int. Cl.⁷ .............................................. G01F 15/00
(52) U.S. Cl. ...................................................... 73/281
(58) Field of Search ........................ 73/281, 266, 267, 73/268, 269, 278, 279; 91/1

(56) References Cited

U.S. PATENT DOCUMENTS

| | | | | |
|---|---|---|---|---|
| 3,668,929 A | * | 6/1972 | Ruddy .......................... | 73/281 |
| 4,091,668 A | * | 5/1978 | Namikawa et al. ........... | 73/281 |
| 4,520,676 A | * | 6/1985 | Hicks et al. .................. | 73/281 |
| 4,901,567 A | * | 2/1990 | Bertke et al. ................. | 73/268 |

* cited by examiner

Primary Examiner—Edward Lefkowitz
Assistant Examiner—Takisha Miller
(74) Attorney, Agent, or Firm—David L. Davis (57) ABSTRACT

An adjustable tangent assembly for a positive displacement diaphragm gas meter is provided with a cam on the stroke adjuster. Use of the cam results in a linear relationship between angular movement of the stroke adjuster and the stroke adjustment.

4 Claims, 7 Drawing Sheets

DIAPHRAGM GAS METER TANGENT ASSEMBLY UTILIZING A CAM FOR STROKE ADJUSTMENT

BACKGROUND OF THE INVENTION

This invention relates to diaphragm gas meters and, more particularly, to an improved tangent assembly for use therewith wherein a cam is utilized to adjust the stroke of the meter diaphragms.

Positive displacement diaphragm gas meters typically are provided with a tangent assembly which drivingly couples the diaphragm driven flag assembly to the crank shaft, which is in turn coupled to open and close the slide valves of the meter. It is the motion of the flag assembly, along with the opening and closing of the valves, which determines how much gas is displaced per stroke of the diaphragms. The motion of the flag assembly is typically determined by a linkage system that is centered upon a common wrist. This wrist is supported on a tangent assembly which connects to a crank that controls the opening and closing of the slide valves. It is common practice to provide a tangent assembly which is adjustable n order to change the position of the wrist relative to the crank, thereby affecting the "stroke" of the diaphragms as well as the "timing" of the valves.

The stroke is determined by the radial distance from the wrist to the center of rotation of the crank. The greater this distance, the larger the volume of gas displaced per revolution of the tangent assembly. The timing of the valves is determined by the angular position of the wrist around the crank. It is desirable when adjusting one of the stroke and timing parameters that the other parameter is not affected. It is also desirable that the parameters are easy and quick to adjust, in order to lessen the calibration time. Ideally, it would be desirable to simplify the adjustment to the point where an automatic calibration system can be provided to eliminate the need for human operator intervention.

SUMMARY OF THE INVENTION

According to the present invention, there is provided an improved tangent assembly for a positive displacement diaphragm gas meter. The inventive tangent assembly drivingly couples a flag assembly to a crank shaft rotatable about an axis and includes a base non-rotatably connected to the crank shaft along the axis of rotation of the crank shaft and a plate overlying the base and slidable thereon. The base is formed with a circular opening concentric with the crank shaft axis of rotation. The plate is formed with a stepped opening therethrough which is alignable over the circular opening of the base. The stepped opening has a lower opening in the shape of an elongated slot with a width greater than the diameter of the circular opening and an upper opening of larger dimension than the lower opening. The upper opening has a pair of opposed cam follower projections extending therein along a central major longitudinal axis of the elongated slot. A wrist pin is fixedly connected to the plate and extends outwardly therefrom parallel to the crank shaft axis rotation, and the flag assembly is connected to the wrist pin. A stroke adjuster is provided for slidably moving the plate relative to the base so as to vary the distance between the wrist pin and the crank shaft axis of rotation. The stroke adjuster includes a pointer overlying the plate and a post secured to the pointer and extending through the stepped opening of the plate and into the circular opening of the base. The stroke adjuster post has first, second and third levels. The first level is adjacent to the pointer and includes a cam rotatable within the upper opening of the plate and engaging both of the pair of cam follower projections. The second level of the post is adjacent to the first level and is cylindrical with a diameter equal to the width of the elongated slot of the lower opening of the plate and is rotatable in the elongated slot. The third level of the post is adjacent to the second level and is cylindrical with a diameter equal to the diameter of the circular-opening of the base and is rotatable in the circular opening. Accordingly, rotation of the stroke adjuster results in a change of the distance between the wrist pin and the axis of rotation of the crank shaft.

In accordance with an aspect of this invention, the profile of the cam results in a linear relationship between angular movement of the stroke adjuster and change of distance between the wrist pin and the crank shaft axis of rotation.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
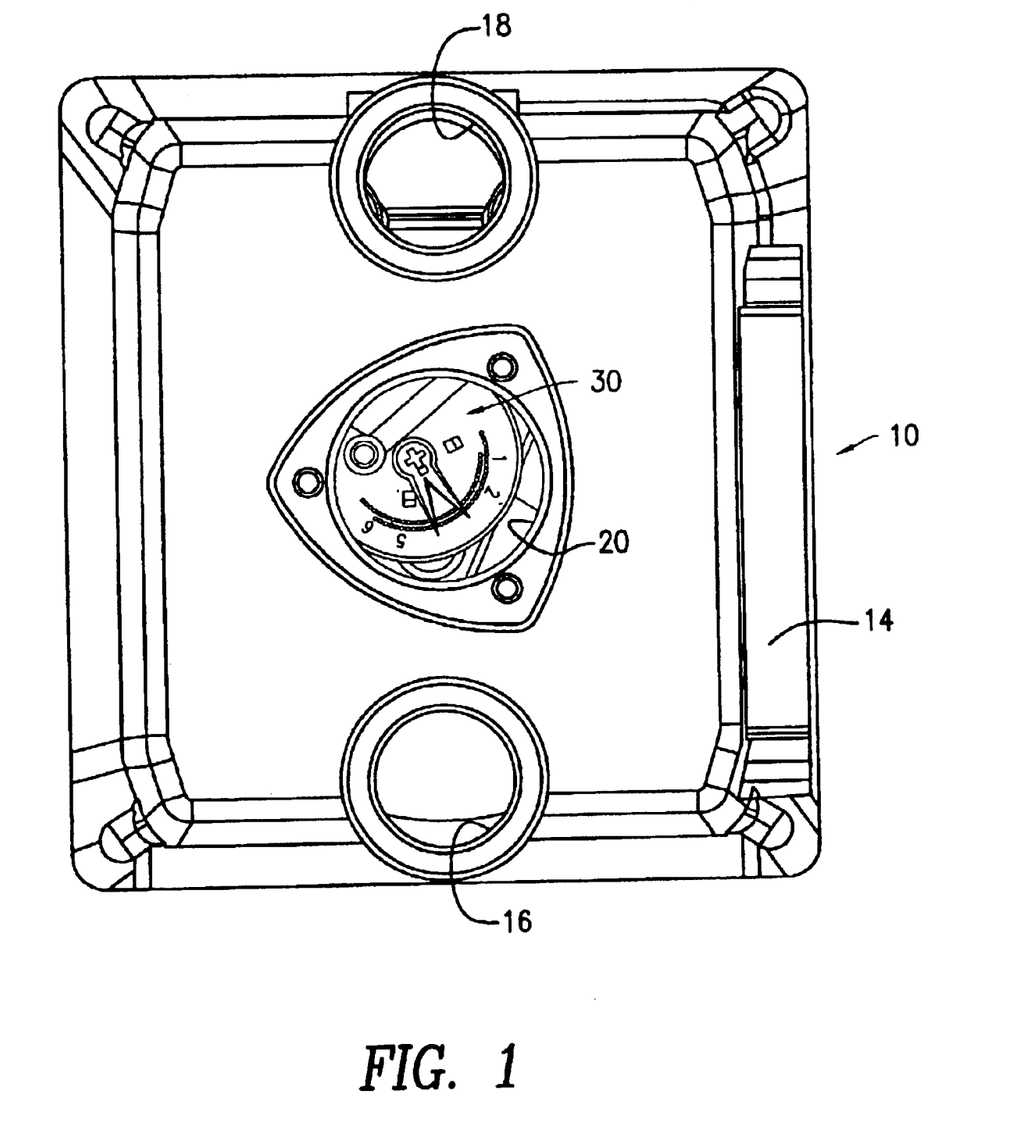
FIG. 1 is a top plan view of a positive displacement diaphragm gas meter with the hand hole cover removed, showing the adjustable tangent assembly according to the present invention.
Figure 2:
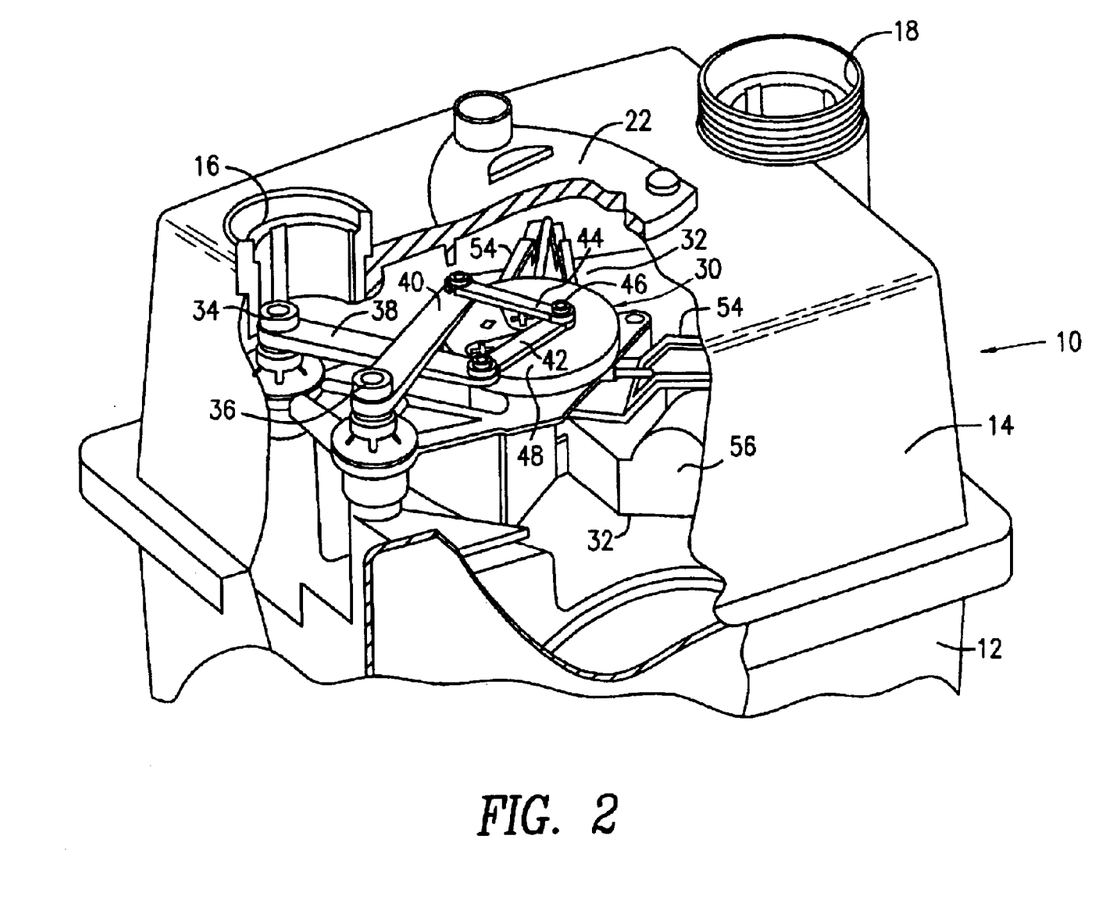
FIG. 2 is a perspective view, partially cut away, of the upper portion of the meter shown in FIG. 1, illustrating the tangent assembly according to the present invention.

Referring now to the drawings, FIG. 1 shows a top plan view of a rotary positive displacement diaphragm meter, designated generally by the reference numeral 10, and FIG. 2 is a perspective view, partially cut away, showing the upper portion of the meter 10. The meter 10 has a housing including a body portion 12 and a cover 14. The cover 14 includes a gas inlet connector 16 and a gas outlet connector 18, as is conventional in the art. The cover 14 is formed with a hand hole 20 which, during use of the meter 10, is sealed by the hand hole cover 22. The inventive tangent assembly, designated generally by the reference numeral 30, is visible and accessible through the hand hole 20.

Referring now to FIG. 2, shown therein is the gas distributing chamber of the meter 10. As is well known, gas enters the inlet connector 16 and passes into the gas distributing chamber for delivery into the gas measuring chambers (not shown) through the valve seats 32 which control the flow of gas into and out of the measuring chambers for subsequent exiting from the meter through the outlet connector 18. Flag rods 34, 36 are connected to be actuated by the measuring chambers and are fixed to the long flag arms 38, 40, respectively, connected by the short flag arms, 42, 44 to the wrist pin or post 46 fixedly attached to the plate 48 of the inventive tangent assembly 30.

Figure 3:
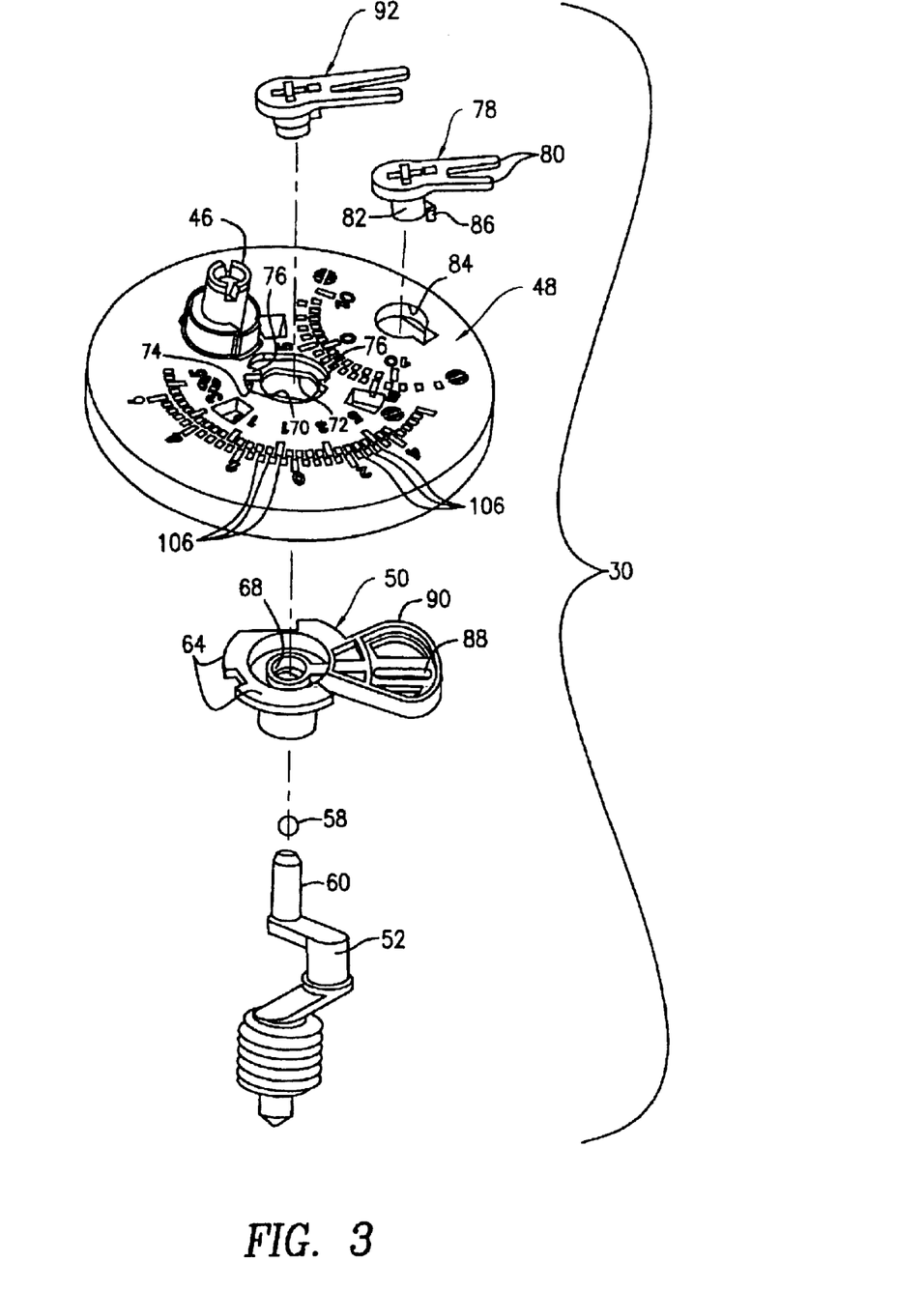
FIG. 3 is an exploded perspective view, from above, of the tangent assembly according to the present invention.
Figure 4:
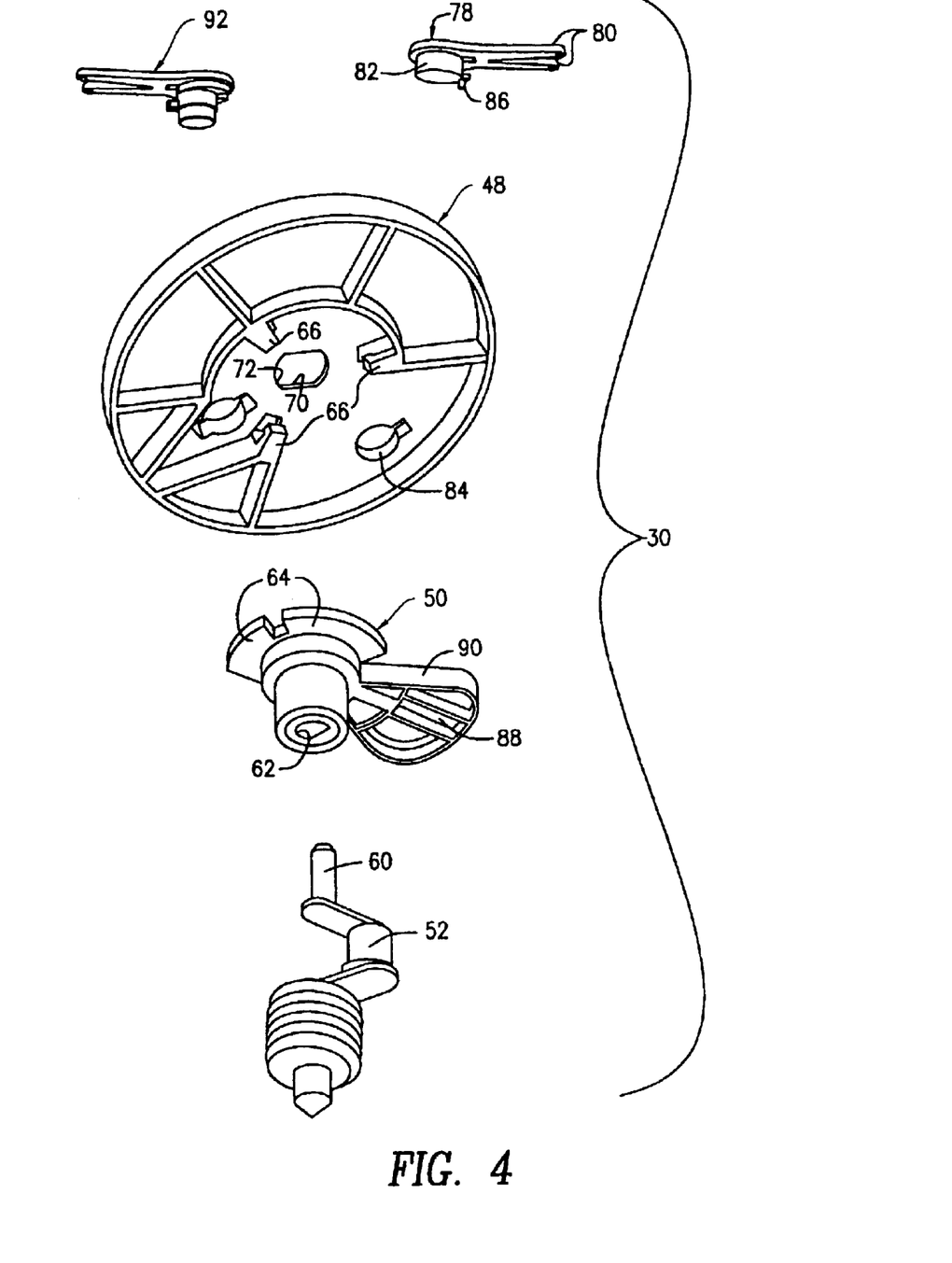
FIG. 4 is an exploded perspective view, from below, of the tangent assembly according to the present invention.

Referring now to FIGS. 3 and 4, the tangent assembly 30 has a base 50 non-rotatably connected to a crank shaft 52 having the usual crank connected by arms 54 (FIG. 2) to slide valves 56 on the valve seats 32. The volume of gas measured by the meter 10 is controlled by the valves 56, which in turn are adjustable as to timing and controlled by the diaphragm stroke, which in turn is adjustable at the tangent assembly 30. By adjusting the distance between the wrist pin 46 and the axis of rotation of the crank shaft 52, this controls the stroke of the diaphragm flag arms 42 and 44 corresponding to the volume displacement of the diaphragms. The timing of the valve operation, so as to change the time of opening and closing of the valves 56, is determined by the angular position of the wrist 46 relative to the axis of rotation of the crank shaft 52. With the exception of the inventive tangent assembly 30, the described components are or may be of conventional design.

Referring now to FIGS. 3 and 4, the inventive tangent assembly 30 includes a base 50 non-rotatably connected to the crank shaft 52 along the axis of rotation 58 of the crank shaft 52. This is illustratively accomplished by providing a flat (not shown) on the crank shaft post 60 and a complementary D-shaped opening 62 in the base 50. The plate 48 overlies the base 50 and is slidable thereon. This is accomplished by providing a flange 64 on the base 50 which is slidably captured by the projections 66 on the underside of the plate 48 which are spaced from the main body portion of the plate 48 by a distance equal to the thickness of the flange 64. The base 50 is formed with a circular opening 68 concentric with the crank shaft axis of rotation 58 and the plate 48 is formed with a stepped opening 70 therethrough which is alignable over the circular opening 68 of the base 50. The stepped opening 70 has a lower opening 72 in the shape of an elongated slot with a width greater than the diameter of the circular opening 68 of the base 50. The stepped opening 70 also has an upper opening 74 of larger dimension than the lower opening 72. The upper opening 74 has a pair of opposed cam follower projections 76 extending into the upper opening 74 along a central major longitudinal axis of the lower opening 72.

Timing adjustment is provided by the adjuster 78. The adjuster 78 has a pair of pointer fingers 80 and a downwardly depending post 82 which extends through, and is rotatable in, the opening 84 in the plate 48. The timing adjuster 78 further includes an eccentric pin 86 which rides in the slot 88 of the base extension 90. The slot 88 extends radially outwardly from the axis of rotation 58 of the crank shaft 52. Accordingly, rotation of the timing adjuster 78 causes the plate 48 to rotate relative to the base 50 about the axis of rotation 58, thereby changing the angle of the wrist 46 with respect to the crank shaft 52. The foregoing description of timing adjustment is included for the sake of a complete disclosure but forms no part of the present invention.

Figure 5:
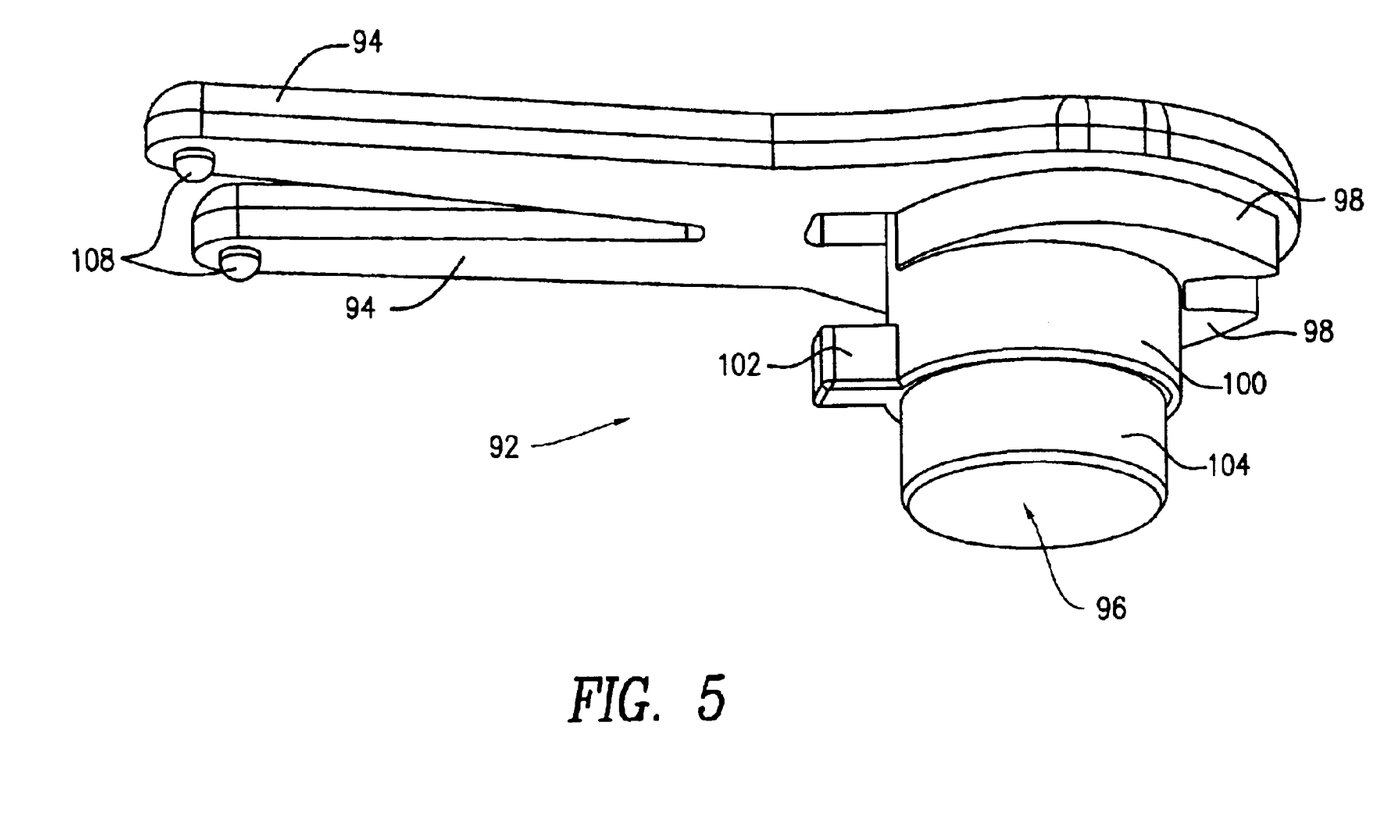
FIG. 5 is a perspective view, from below, of the stroke adjuster of the tangent assembly according to the present invention.

The present invention is particularly concerned with adjustment of the stroke of the meter. Accordingly, the inventive stroke adjuster 92 is provided. The stroke adjuster 92 is arranged to slidably move the plate 48 relative to the base 50 so as to vary the distance between the wrist pin 46 and the center of rotation 58 of the crank shaft 52. As clearly shown in FIG. 5, the stroke adjuster 92 includes a pair of pointer fingers 94 which overlie the plate 48 and a post 96 secured to the pointer fingers 94. The post 96 extends through the stepped opening of the plate 48 and into the circular opening 68 of the base. The post 96 has three levels. The first level of the post 96 is adjacent to the level of the pointer fingers 94 and includes a cam 98 rotatable within the upper opening 74 of the stepped opening of the plate 48. The cam 98 engages both of the cam follower projections 76. The second level 100 of the post 96 is adjacent to the first level and is cylindrical with a diameter equal to the width of the elongated slot of the lower opening 72 of the stepped opening 70 of the plate 48. The second level 100 is rotatable within the lower opening 72 and includes a projection 102 spaced from the level of the pointer fingers 94 by a distance equal to the thickness of the main portion of the plate 48 so as to capture the stroke adjuster 92 to the plate 48. The third level 104 of the post 96 is adjacent to the second level 100 and is cylindrical with a diameter equal to the diameter of the circular opening 68 of the base 50, so as to be rotatable within the circular opening 68. Accordingly, rotation of the stroke adjuster 92 about the axis of rotation 58 of the crank shaft 52 causes rotation of the cam 98 which engages the cam follower projections 76 so as to cause the plate 48 to slide relative to the base 50 and vary the distance between the wrist pin 46 and the axis of rotation 58 of the crank shaft 52.

The plate 48 is provided with a plurality of spaced depressions 106 arranged along a curved path and the stroke adjuster 92 is formed with domed projections 108 along its underside at the ends of the pointer fingers. Accordingly, the projections 108 and the depressions 106 together provide a detent function. As will become apparent from the following discussion, the profile of the cam 98 results in a linear relationship between angular movement of the stroke adjuster 92 and change of distance between the wrist pin 46 and the axis of rotation 58 of the crank shaft 52.

Figure 6:
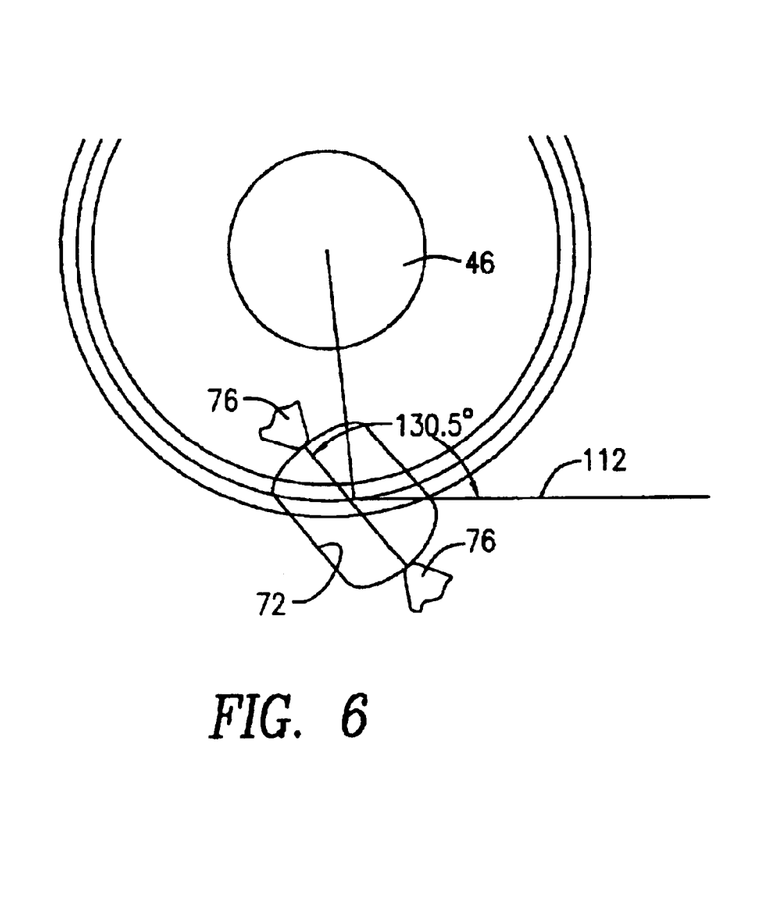
FIGS. 6–9 are illustrations useful in understanding the design of the cam profile of the stroke adjuster shown in FIG. 5.
Figure 7:
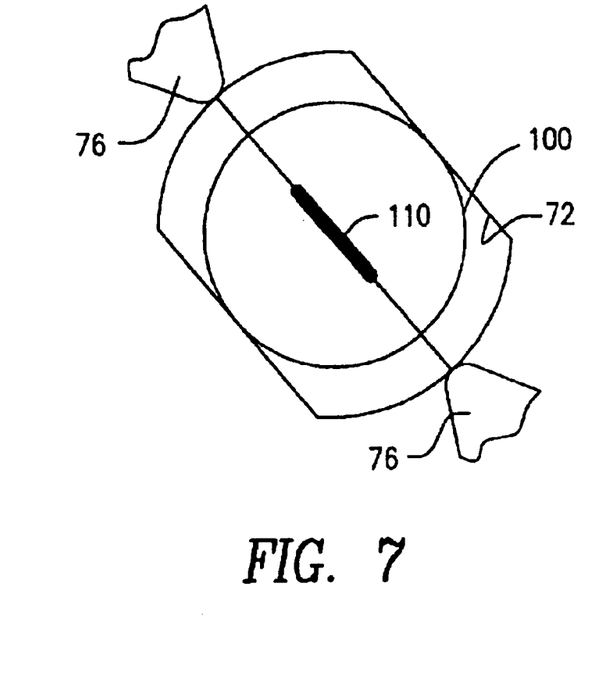
Figure 8:
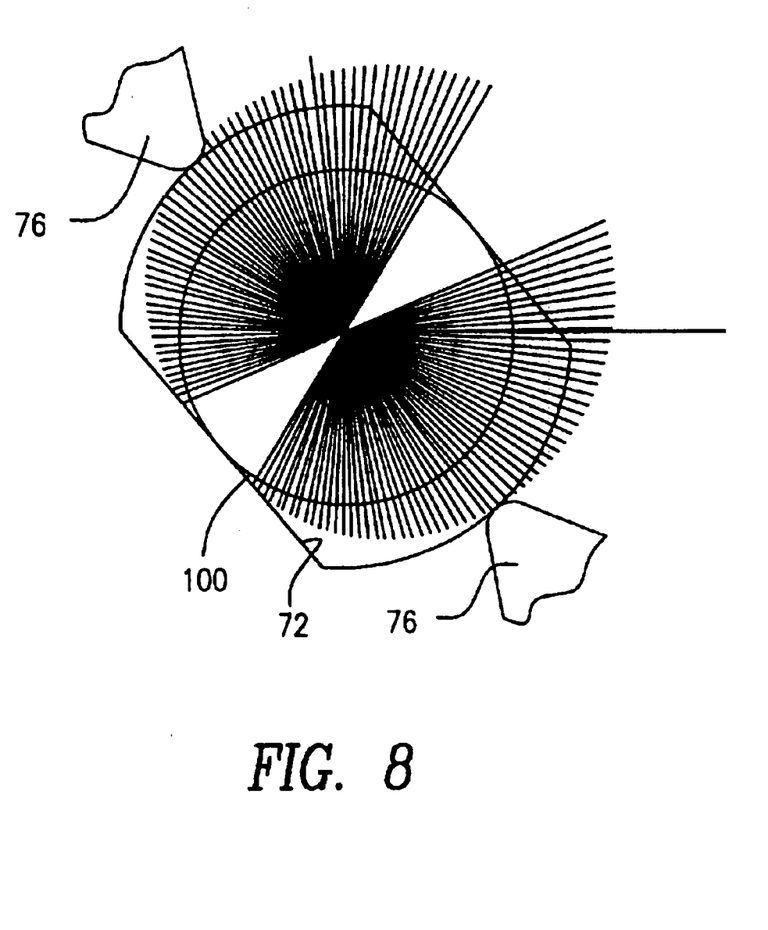
Figure 9:
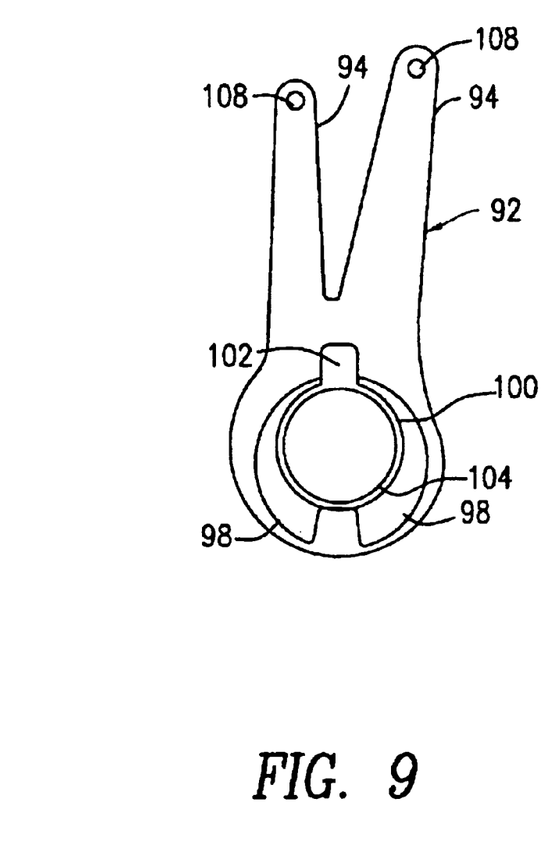

The profile of the cam 98 was determined in the following manner. First, the position of the stroke adjuster 92 in order to provide a specific stroke was determined. This was done by intersecting a radius from the wrist pin 46 with a line through the center of the lower opening 72, as shown in FIG. 6. This was done for sixty different radii (every 0.001 inches). Once these points were determined, their distances from the tips of the followers 76 were found. Each of these points was also matched with an angle. For example, the center point was matched with the angle 0° and the end points were matched with the angles +72° and −72°. The center of the stroke adjuster 92 moves along the dark line 110 in FIG. 7. When the cam is designed, you start at 0° and draw a line so that when it is in the slot, the cam will be forced into the center position. Then, when it is turned every 2.4°, it is forced into the next point, by adjusting the radii to match the distances that were found earlier. The points where the follower projections 76 touch on the cam will always be 0.300 inches apart all the way around the cam, the center of the cam just moving along the line 110. The result is shown in FIG. 8, and FIG. 9 is a bottom plan view of the stroke adjuster 92 showing the cam 98. The foregoing specific numbers are for illustration purposes only.

In summary, the pair of opposed cam follower projections 76 lie along a line passing through the center of rotation of the cam 98 (i.e., the center of rotation of the stroke adjuster 92). The profile of the cam 98 is such that a line drawn through the center of rotation of the cam and having its ends terminating at the periphery of the cam is of constant length over the angular range of the cam. Accordingly, rotation of the stroke adjuster 92 results in linear movement of the plate 48 relative to the base 50 with the center of rotation of the cam 98 moving along the central major longitudinal axis 110 of the elongated slot of the lower opening 72.

In the past, in order to maintain independence between the timing and stroke adjustments, it was common to have the stroke adjustment move along a line from the wrist to the timing adjuster. Due to space limitations, this could not be done in the aforedescribed tangent assembly. However, it was found that by appropriate choice of the angle of the stroke adjustment, the independence of the adjustments could be optimized. Specifically, if one draws a line 112 (FIG. 6) from the center of the stroke adjustment to the center of rotation of the timing adjustment, the preferred angle for the stroke adjustment is 130.5°.

Accordingly, there has been disclosed an improved tangent assembly for a positive displacement diaphragm gas meter. The disclosed construction lends itself to automated operation since a predetermined angular movement of the stroke adjuster results in a predetermined stroke adjustment. It is understood that the above-described arrangement is merely illustrative of the application of the principles of the invention Numerous other arrangements may be devised by those skilled in the art without departing from the spirit and scope of this invention and it is therefore intended that this invention be limited only by the scope of the appended claims.

What is claimed is:

1. A tangent assembly for a positive displacement diaphragm gas meter to drivingly couple a flag assembly to a crank shaft rotatable about an axis, comprising:

a base non-rotatably connected to said crank shaft along the axis of rotation thereof, wherein said base is formed with a circular opening concentric with said crank shaft axis of rotation;

a plate overlying said base and slidable thereon, wherein said plate is formed with a stepped opening through said plate alignable over said base circular opening, said stepped opening having a lower opening in the shape of an elongated slot with a width greater than the diameter of said circular opening and an upper opening of larger dimension than said lower opening and having a pair of opposed cam follower projections extending into said upper opening along a central major longitudinal axis of said elongated slot;

a wrist pin fixedly connected to said plate and extending outwardly therefrom parallel to said crank shaft axis of rotation;

means for connecting said flag assembly to said wrist pin; and a stroke adjuster for slidably moving said plate relative to said base so as to vary the distance between said wrist pin and said crank shaft axis of rotation, said stroke adjuster including a pointer overlying said plate and a post secured to said pointer and extending through the stepped opening of said plate and into the circular opening of said base;

wherein said stroke adjuster post has first, second and third levels with said first level being adjacent to said pointer and including a cam rotatable within said upper opening of said plate and engaging both of said pair of cam follower projections, said second level being adjacent to said first level and being cylindrical with a diameter equal to the width of said elongated slot of said lower opening of said plate and rotatable in said elongated slot, and said third level being adjacent to said second level and being cylindrical with a diameter equal to the diameter of said circular opening of said base and rotatable in said circular opening;

whereby rotation of said stroke adjuster results in a change of the distance between said wrist pin and said crank shaft axis of rotation.

2. The tangent assembly according to claim 1 wherein the profile of said cam results in a linear relationship between the angular movement of said stroke adjuster and change of distance between said wrist pin and said crank shaft axis of rotation.

3. The tangent assembly according to claim 1 wherein said plate is formed with a plurality of spaced depressions arrayed along a curved path and said stroke adjuster pointer is formed with a projection on its underside;

whereby the stroke adjuster pointer projection and the plurality of spaced depressions together provide a detent function.

4. The tangent assembly according to claim 1 wherein:

said pair of opposed cam follower projections lie along a line passing through the center of rotation of said cam; and said cam profile is such that a line drawn through the center of rotation of said cam terminating at the periphery of said cam is of constant length over the angular range of said cam;

whereby rotation of said stroke adjuster results in linear movement of said plate relative to said base with the center of rotation of said cam moving relative to said plate along the central major longitudinal axis of said elongated slot.

* * * * *